United States Patent
Kim et al.

(10) Patent No.: US 8,980,466 B2
(45) Date of Patent: Mar. 17, 2015

(54) PACKING STRUCTURE FOR LITHIUM ION POLYMER BATTERY

(75) Inventors: Kyung Joon Kim, Incheon (KR); Hyang Mok Lee, Daejeon (KR); Ki Chul Hong, Seoul (KR); Sung Min Hwang, Seoul (KR); Sung Choon Choo, Seoul (KR); Kyu Seong Lee, Goyang-si (KR)

(73) Assignee: LG Chem, Ltd. (KR)

( * ) Notice: Subject to any disclaimer, the term of this patent is extended or adjusted under 35 U.S.C. 154(b) by 127 days.

(21) Appl. No.: 12/580,531

(22) Filed: Oct. 16, 2009

(65) Prior Publication Data

US 2010/0035145 A1 Feb. 11, 2010

Related U.S. Application Data

(62) Division of application No. 10/956,923, filed on Oct. 1, 2004, now abandoned.

(30) Foreign Application Priority Data

Oct. 1, 2003 (KR) .................. 10-2003-0068218

(51) Int. Cl.
*H01M 2/02* (2006.01)
*H01M 2/10* (2006.01)
(Continued)

(52) U.S. Cl.
CPC ............ *H01M 2/1094* (2013.01); *H01M 2/021* (2013.01); *H01M 2/0275* (2013.01);
(Continued)

(58) Field of Classification Search
IPC ............... H01M 2/021,2/0217, 2/275, 2/02771, H01M 2/094, 2/347, 2/0287, 10/052, 10/425, H01M 10/0525, 10/0565; Y02E 60/122
See application file for complete search history.

(56) References Cited

U.S. PATENT DOCUMENTS 6,218,041 B1 * 4/2001 Barbier et al. .................. 429/96
6,225,825 B1 5/2001 Hopsecger
(Continued)

FOREIGN PATENT DOCUMENTS

JP 2001196048 A 1/2000
JP 2000-182579 6/2000
(Continued)

OTHER PUBLICATIONS

Translation of Taiwan IPO office action dated Oct. 26, 2006.
(Continued)

*Primary Examiner* — Alix Eggerding
(74) *Attorney, Agent, or Firm* — Lerner, David, Littenberg, Krumholz & Mentlik, LLP

(57) ABSTRACT

Disclosed is a packing structure for a lithium ion polymer battery, which includes: a battery casing including a lower multilayer polymer and an upper multilayer polymer, wherein the lower multilayer polymer has an inner space of a predetermined size for housing at least one electrode assembly and an electrolyte and is provided with an extension portion extending radially and outwardly from a top edge of each vertical portion of the lower multilayer polymer, a part of the upper multilayer polymer is coupled rotatably to a part of the extension portion of the lower multilayer polymer and remaining parts of the upper multilayer polymer are sealed to remaining parts of the extension portion of the lower multilayer polymer; and a battery protection member, which wraps the outer circumference of the battery casing so that the battery contained in the battery casing can be protected from external impact, and is fixed integrally by a part of the sealed extension portions. The packing structure can protect a battery from external impact while minimizing an increase in size of the whole battery.

2 Claims, 4 Drawing Sheets

(51) Int. Cl.
  *H01M 2/34* (2006.01)
  *H01M 10/052* (2010.01)
  *H01M 10/42* (2006.01)
  *H01M 10/0525* (2010.01)
  *H01M 10/0565* (2010.01)

(52) U.S. Cl.
  CPC .......... *H01M2/0277* (2013.01); *H01M 2/0287* (2013.01); *H01M 2/347* (2013.01); *H01M 10/052* (2013.01); *H01M 10/0525* (2013.01); *H01M 10/0565* (2013.01); *H01M 10/425* (2013.01); *Y02E 60/122* (2013.01)
  USPC .......................... 429/179; 429/163; 429/186

(56) References Cited

U.S. PATENT DOCUMENTS

| | | | |
|---|---|---|---|
| 6,228,528 | B1 | 5/2001 | Burkholder et al. |
| 6,296,971 | B1 | 10/2001 | Hara |
| 6,319,630 | B1 * | 11/2001 | Hasegawa et al. ............ 429/162 |
| 6,415,474 | B1 | 7/2002 | Schmidt |
| 6,451,474 | B1 | 9/2002 | Kozu et al. |
| 6,653,018 | B2 * | 11/2003 | Takahashi et al. ............ 429/185 |
| 7,132,196 | B2 | 11/2006 | Morita et al. |
| 7,261,971 | B2 | 8/2007 | Higuchi et al. |
| 2002/0142195 | A1 | 10/2002 | Ehara |
| 2003/0180609 | A1 | 9/2003 | Yamashita et al. |
| 2004/0029000 | A1 * | 2/2004 | Morita et al. ................. 429/162 |

FOREIGN PATENT DOCUMENTS

| | | |
|---|---|---|
| JP | 2000182579 A | 6/2000 |
| JP | 2002124233 | 4/2002 |
| JP | 2003178747 | 6/2003 |
| JP | 2003323876 A | 11/2003 |
| KR | 2004-0027365 A | 4/2004 |

OTHER PUBLICATIONS

Supplementary European Search Report issued in the corresponding European Patent Application No. 04 774 712.6/1668720 on Apr. 26, 2010 (claiming priority from Korean Patent Application No. 10-2003-0068218); PCT/KR2004002462.

PCT International Search Report; International Application No. PCT/KR2004/002462; International filed Sep. 24, 2004; Date of mailing Dec. 23, 2004.

* cited by examiner

PACKING STRUCTURE FOR LITHIUM ION POLYMER BATTERY

CROSS-REFERENCE TO RELATED APPLICATIONS

This application is a divisional of U.S. application Ser. No. 10/956,923, filed on Oct. 1, 2004, which claims priority to Korean Patent Application No. 10-2003-0068218 filed on Oct. 1, 2003, and all the benefits accruing therefrom under 35 U.S.C. 119, the content of which is incorporated herein by reference in its entirety.

TECHNICAL FIELD

The present invention relates to a packing structure for a lithium ion polymer battery. More particularly, the present invention relates to a packing structure for a lithium ion polymer battery wherein a battery protection member is fixed to the outer circumference of a battery casing for housing the battery so that the battery contained in the battery casing can be protected from external impact. Further, the present invention relates to a packing structure for a lithium ion polymer battery, which reduces the whole size of a battery so that a device operated by the battery can be downsized.

BACKGROUND ART

In general, as shown in FIGS. 1 and 2, a lithium ion polymer battery 1, also referred to as a "pouch battery", includes: a main casing body 2 having an inner space 2a of a predetermined size; a cover 3 coupled rotatably to the main casing body 2; a predetermined number of electrode assemblies 4 inserted in the inner space 2a of the main casing body 2, the electrode assembly including a cathode plate 4a, an anode plate 4b and a separator 4c; tabs 5 extending longitudinally and outwardly from the ends of the cathode plate 4a and the anode plate 4b of the electrode assemblies 4; and a cathode terminal 6 and an anode terminal 7 connected to each tab 5.

Additionally, in the top edge of the inner space 2a of the main casing body 2, an extension portion 2b extending horizontally and outwardly by a predetermined width is formed for the purpose of heat fusion. Further, the central part of each of the cathode terminal 6 and the anode terminal 7 connected to the tab 5 is coated with an insulation tape 8 formed of a non-conductive material. The insulation tape 8 is aimed to prevent a short circuit between a heat fusion device (not shown) and electrode terminals 6,7, when the extension portion 2b of the main casing body 2 is fused with an edge portion 3a of the cover 3 by means of the heat fusion device.

The above-mentioned pouch type lithium ion polymer battery according to the prior art may be prepared by the method as described hereinafter.

First, a predetermined number of electrode assemblies 4 including the cathode plate 4a, the anode plate 4b and the separator 4c are inserted into the inner space 2a of the main casing body 2. Next, a predetermined amount of electrolyte is injected into the inner space 2a.

In this state, the tabs 5 of each electrode assembly 4 are connected to the corresponding electrode terminals 6,7 coated with the insulation tape 8 at the central part thereof. Additionally, each electrode terminal 6,7 and the insulation tape 8 are partially protruded from the main casing body 2 and the cover 3.

Then, the cover 3 is caused to be in close contact with the main casing body 2. Next, the extension portion 2b of the main casing body 2 and the edge portion 3a of the cover 3 are sealed using the heat fusion device so as to prevent leakage of the electrolyte.

However, such a conventional pouch type lithium ion polymer battery has problems in that an extension portion formed at the top edge of a main casing body for housing a predetermined number of electrode assemblies (so that it can be heat-fused to the corresponding edge portion of a cover) is too large compared to the effective size of the electrode assembly, and that the outer circumference of the main casing body coupled to the cover is wrapped with a separate plastic casing, thereby increasing the whole size of battery.

DISCLOSURE OF THE INVENTION

Therefore, the present invention has been made in view of the above-mentioned problems. It is an object of the present invention to provide a packing structure for a lithium ion polymer battery, which protects a battery from external impact while minimizing an increase in size of the whole battery.

It is another object of the present invention to provide a packing structure for a lithium ion polymer battery, which protects a battery safely when it is mounted on a charger or any desired devices and thus has a possibility of overcharge/overdischarge being generated, by interrupting the connection between the battery and the charger or devices promptly.

According to an aspect of the present invention, there is provided a packing structure for a lithium ion polymer battery, which includes: a battery casing including a lower multilayer polymer and an upper multilayer polymer, wherein the lower multilayer polymer has an inner space of a predetermined size for housing at least one electrode assembly and an electrolyte and is provided with an extension portion extending radially and outwardly from the top edge of each vertical portion of the lower multilayer polymer, and a part of the upper multilayer polymer is coupled rotatably to a part of the extension portion of the lower multilayer polymer and remaining parts of the upper multilayer polymer are sealed to remaining parts of the extension portion of the lower multilayer polymer; and a battery protection member, which wraps the outer circumference of the battery casing so that the battery contained in the battery casing can be protected from external impact, and is fixed integrally by a part of the sealed extension portions.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention as shown in FIGS. 3 to 8.

Figure 1:
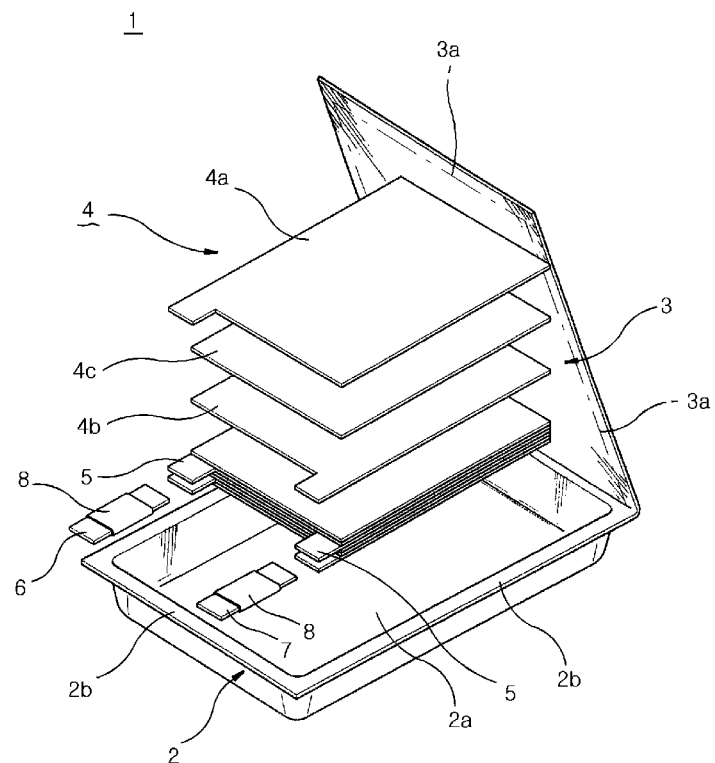
FIG. 1 is a schematic exploded perspective view showing a conventional pouch type battery according to the prior art.
Figure 2:
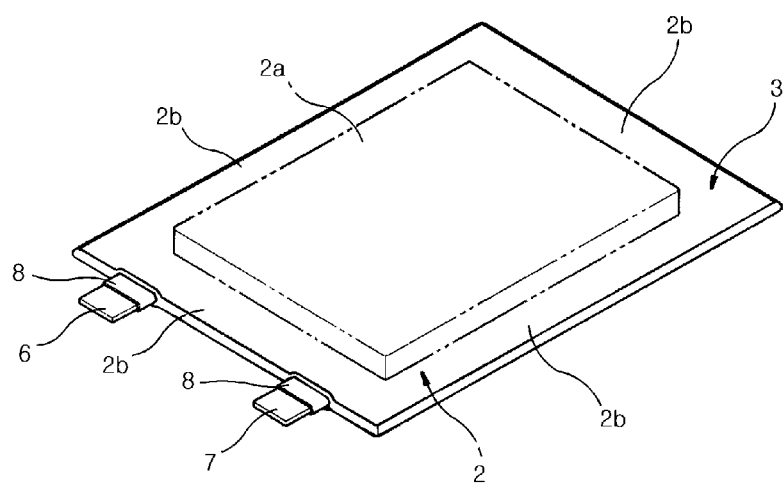
FIG. 2 is a schematic perspective view of the pouch type battery as shown in FIG. 1.
Figure 3:
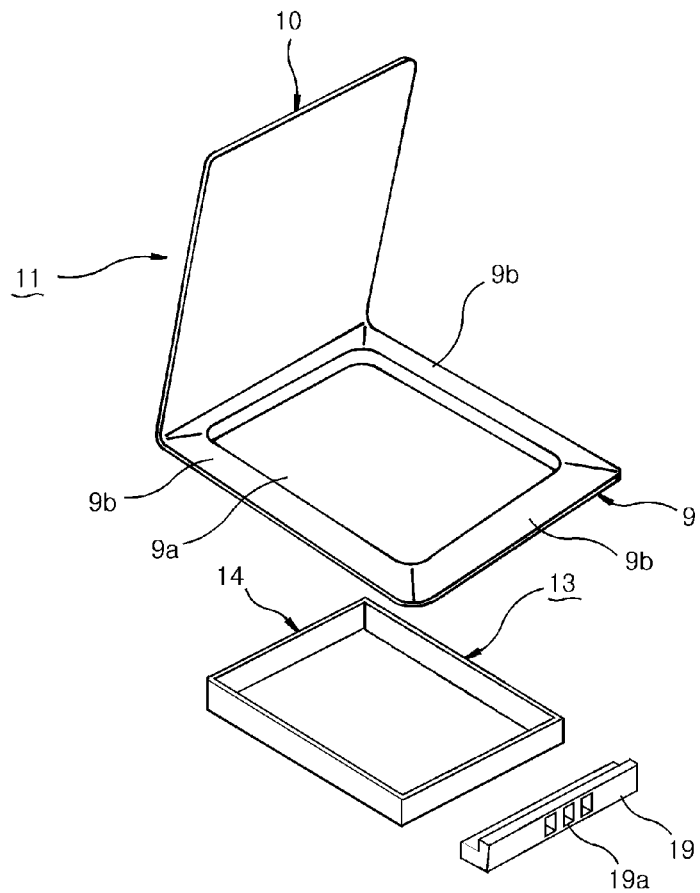
FIG. 3 is a schematic exploded perspective view showing a battery protection member and a PCB (protection circuit board) applied to the packing structure for a lithium ion polymer battery according to the present invention, as provided separately from each other.
Figure 5:
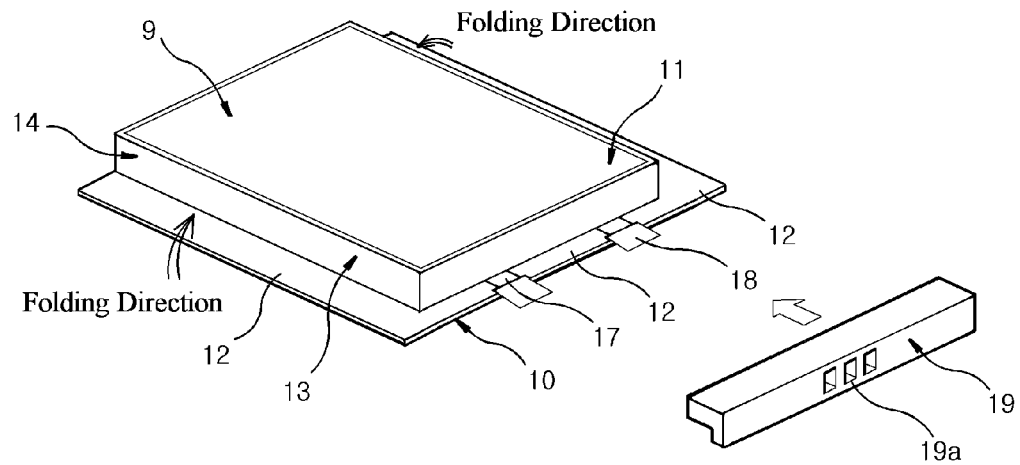
FIG. 5 is a schematic perspective view showing how to fix a battery protection member applied to the packing structure for a lithium ion polymer battery according to the present invention to the outer circumference of a battery casing.

FIG. 3 is a schematic exploded perspective view showing a battery protection member and a PCB (protection circuit board) applied to the packing structure for a lithium ion polymer battery according to the present invention, as provided separately from each other. FIG. 5 is a schematic perspective view showing how to fix a battery protection member applied to the packing structure for a lithium ion polymer battery according to the present invention to the outer circumference of a battery casing.

As shown in FIGS. 3 and 5, the packing structure according to the present invention includes:

a battery casing 11 including a lower multilayer polymer 9 and an upper multilayer polymer 10, wherein the lower multilayer polymer 9 has an inner space 9a of a predetermined size for housing at least one electrode assembly (not shown) and an electrolyte and is provided with an extension portion 9b extending radially and outwardly from the top edge of each vertical portion of the lower multilayer polymer 9, a part of the upper multilayer polymer 10 is coupled rotatably to a part of the extension portion 9b of the lower multilayer polymer 9 and remaining parts of the upper multilayer polymer 10 are sealed to remaining parts of the extension portion 9b of the lower multilayer polymer 9; and a battery protection member 13, which wraps the outer circumference of the battery casing 11 so that the battery contained in the battery casing can be protected from external impact, and is fixed integrally by a part of the sealed extension portions 12.

More particularly, the battery protection member 13 may have the shape of a hollow frame 14 corresponding to the edges of the battery casing 11. Otherwise, it may have the shape of a cover 15 for tightly wrapping outer surfaces of the lower multilayer polymer 9 forming one side of the battery casing 11 (See FIGS. 3, 5 and 7).

Additionally, at least one crossing member (not shown) facing to the outer surface of the battery casing 11 may be formed on one side of the hollow frame 14 at predetermined intervals.

Figure 8:
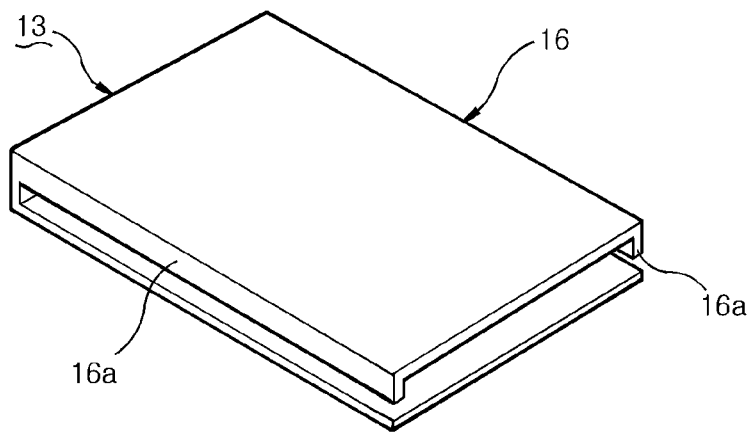
FIG. 8 is a schematic perspective view showing a "⊏"-shaped battery protection member applied to the packing structure for a lithium ion polymer battery according to the present invention.

In another embodiment, the battery protection member 13 may have the shape of a "⊏"-shaped battery protection member 16 which wraps both the top surface and the bottom surface of the battery casing 11 (See FIG. 8).

Further, a vertical extension portion 16a for wrapping the lateral surfaces of the battery casing 11 may be formed at both sides of the "⊏"-shaped battery protection member 16.

Meanwhile, the battery protection member 13 may be made of plastics, metals or combinations thereof. Any materials that can be injected or processed with ease while maintaining a desired strength may be used in the battery protection member 13.

Figure 6:
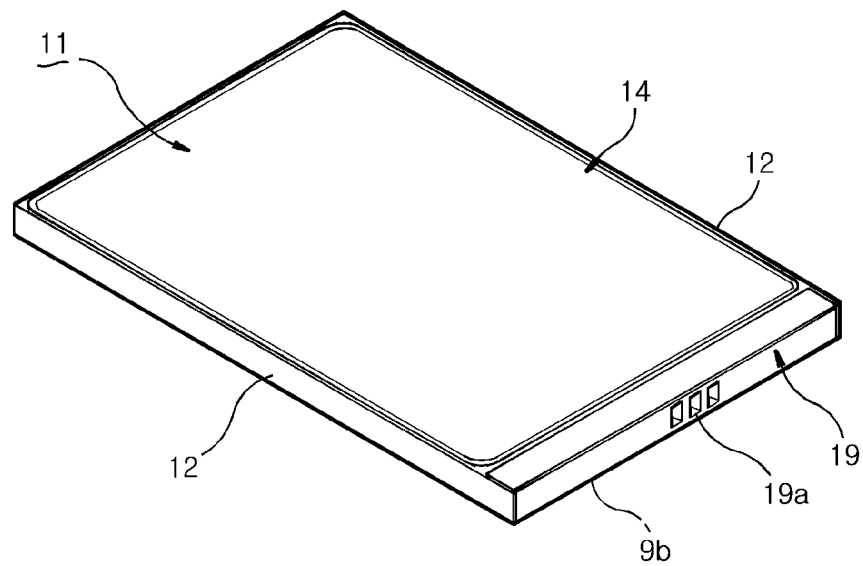
FIG. 6 is a schematic perspective view of the packing structure for a lithium ion polymer battery as shown in FIG. 5.
Figure 7:
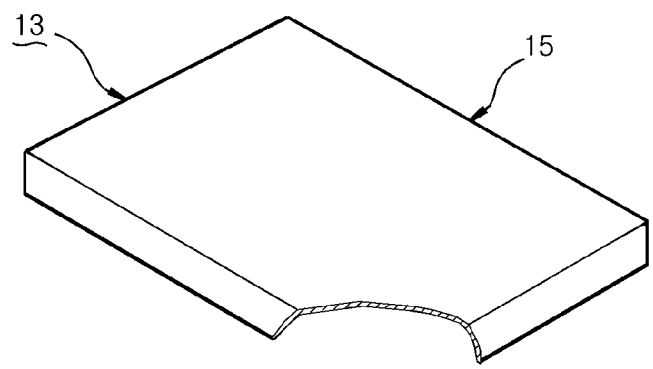
FIG. 7 is a schematic perspective view showing a cover-shaped battery protection member applied to the packing structure for a lithium ion polymer battery according to the present invention.

Preferably, the front part of the extension portion 9b facing to both electrode terminals 17, 18 protruded out from the battery casing 11 is fitted with a PCB (protection circuit board) 19 in such a manner that the PCB 19 can be coupled detachably with the battery protection member 13 (See FIG. 5 and FIG. 6). The PCB 19 is provided with a battery protection circuit (not shown) connected to both electrode terminals 17, 18 so as to prevent overcharge or overdischarge of the battery, and an outlet port 19a for making electric connections between both electrode terminals 17, 18 of the battery and an external device (not shown) through the battery protection circuit.

Figure 4:
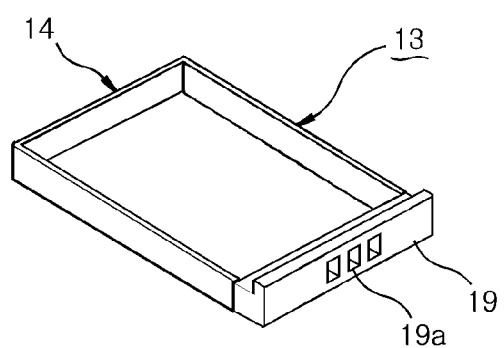
FIG. 4 is a schematic exploded perspective view showing a battery protection member and a PCB (protection circuit board) applied to the packing structure for a lithium ion polymer battery according to the present invention, as coupled integrally to each other.

Particularly, the PCB 19 may be formed to be integrated with a part of the battery protection member 13 in a state wherein the PCB 19 is positioned in a molding space of an injection molding apparatus (See FIG. 4).

Hereinafter, a process for manufacturing a battery by using the above-described packing structure for a lithium ion polymer battery according to the present invention will be explained with reference to FIGS. 3, 5 and 6.

First, a predetermined number of electrode assemblies (not shown) are positioned in the inner space 9a of the lower multilayer polymer 9 forming one side of the battery casing 11 and a predetermined amount of electrolyte is injected into the inner space 9a.

Next, the lower multilayer polymer 9 is covered with the upper multilayer polymer 10 forming the other side of the battery casing 11. The extension portion 9b of the lower multilayer polymer 9 and the corresponding part of the upper multilayer polymer 10 are heat fused together by means of a heat fusion device (not shown) to seal them.

Further, the battery casing 11 is turned upside down and the battery protection member 13 is fixed to the outer circumference of the battery casing 11. Then, both lateral parts of the sealed extension portion 12 formed between the upper multilayer polymer 10 and the lower multilayer polymer 9 are folded and attached to the corresponding lateral surfaces of the battery protection member 13.

In this state, both the cathode terminal 17 and the anode terminal 18, connected to the battery contained in the battery casing 11, protrude out from the front part of the extension portion 9b of the battery casing 11.

Next, the PCB 19 provided with a battery protection circuit (not shown) and the outlet port 19a is aligned with the front part of the extension portion 9b of the lower multilayer polymer 9 in the battery casing 11. Finally, the battery protection circuit of the PCB 19 is connected to each of the electrode terminals 17, 18 and then the PCB 19 is attached to the adjacent counterpart.

Industrial Applicability

As can be seen from the foregoing, according to the present invention, it is possible to protect a battery safely from external impacts while minimizing an increase in size of the whole battery.

Further, it is possible to protect a battery safely when it is mounted on a charger or any desired devices and thus has a possibility of overcharge/ overdischarge being generated, by interrupting the connection between the battery and the charger or devices promptly.

While this invention has been described in connection with what is presently considered to be the most practical and preferred embodiment, it is to be understood that the invention is not limited to the disclosed embodiment and the drawings. On the contrary, this invention is intended to cover various modifications and variations within the spirit and scope of the appended claims.

The invention claimed is:

1. A packing structure for a battery, which comprises:
a battery casing including a first casing member and a second casing member,
wherein the first casing member has an inner space of a predetermined size for housing at least one electrode assembly and an electrolyte and is provided with an extension portion extending radially and outwardly from a top edge of each vertical portion of the first casing member, a part of the second casing member is coupled rotatably to a part of the extension portion of the first casing member and remaining parts of the second casing member are sealed to remaining parts of the extension portion of the first casing member;
a "⊏"-shaped battery protection member which wraps both top surface and bottom surface of the battery casing,
wherein vertical extensions for wrapping lateral surfaces of the battery casing are formed at both sides of the "⊏"-shaped battery protection member, and lateral parts of the sealed extension portions between the first casing member and the second casing member are folded and attached to the corresponding outer lateral surfaces of the vertical extensions; and
a PCB(protection circuit board) coupled detachably with the battery protection member,
wherein a front part of the extension portion facing to both electrode terminals protruded out from the battery casing is fitted with the PCB, the PCB being provided with a battery protection circuit connected to both electrode terminals so as to prevent overcharge or overdischarge of the battery and an outlet port for making electric connections between both electrode terminals of the battery and an external device through the battery protection circuit.

2. The packing structure of claim 1, wherein the "⊏"-shaped battery protection member is integrally formed with the PCB (protection circuit board).

* * * * *